US008270580B2

(12) United States Patent
Surendran

(10) Patent No.: US 8,270,580 B2
(45) Date of Patent: Sep. 18, 2012

(54) INTERACTIVE VOICE ADVERTISEMENT EXCHANGE

(75) Inventor: Arungunram C. Surendran, Sammaish, WA (US)

(73) Assignee: Microsoft Corporation, Redmond, WA (US)

(*) Notice: Subject to any disclaimer, the term of this patent is extended or adjusted under 35 U.S.C. 154(b) by 1205 days.

(21) Appl. No.: 12/060,280

(22) Filed: Apr. 1, 2008

(65) Prior Publication Data

US 2009/0245479 A1 Oct. 1, 2009

(51) Int. Cl.
*H04M 1/64* (2006.01)
(52) U.S. Cl. .......... 379/114.13; 379/70; 379/88.22; 704/270.1
(58) Field of Classification Search ............ 379/88.22, 379/309, 114.13, 70, 211.02; 704/270.01
See application file for complete search history.

(56) References Cited

U.S. PATENT DOCUMENTS

| 6,683,941 | B2* | 1/2004 | Brown et al. ............ 379/88.22 |
| 6,819,759 | B1* | 11/2004 | Khuc et al. ............... 379/309 |
| 6,868,384 | B2 | 3/2005 | Parus et al. |
| 6,891,942 | B1* | 5/2005 | Porter et al. ............ 379/211.02 |
| 7,130,386 | B2 | 10/2006 | Morton |
| 7,248,860 | B2 | 7/2007 | Kamdar et al. |
| 7,697,673 | B2* | 4/2010 | Chiu et al. .............. 379/114.13 |
| 2002/0046030 | A1 | 4/2002 | Haritsa et al. |
| 2002/0051521 | A1 | 5/2002 | Patrick |
| 2003/0031309 | A1 | 2/2003 | Rupe et al. |
| 2003/0216923 | A1* | 11/2003 | Gilmore et al. .......... 704/270.1 |
| 2004/0223593 | A1 | 11/2004 | Timmins et al. |
| 2007/0116227 | A1 | 5/2007 | Vitenson et al. |

FOREIGN PATENT DOCUMENTS

| KR | 10-2001-0093036 A | 10/2001 |
| KR | 10-2003-0093234 A | 12/2003 |
| KR | 10-2005-0089905 A | 9/2005 |
| KR | 10-2005-0116134 A | 12/2005 |
| WO | 2006070407 A2 | 7/2006 |

OTHER PUBLICATIONS

Patrick Barnard, "VoodooVox to Target Call Center Industry with its In-Call Media Service", http://www.tmcnet.com/enews/e-newsletters/Communication-Solutions/20071010/12146-voodoovox-target-call-center-industry-with-its-in.htm, Oct. 9, 2007, pp. 1-5. atrick Barnard, "VoIP Provider JaJah and Online Advertising Network Operator Oridian Sign In-Call Advertising Deal", http://voipservices.tmcnet.com/feature/articles/13876-voip-provider-jajah-online-advertising-network-operator-oridian.htm, Nov. 5, 2007, pp. 1-4.
International Search Report and Written Opinion Received for PCT Application No. PCT/US2009/034819, mailed on Oct. 7, 2009, 11 pages.

* cited by examiner

*Primary Examiner* — Fan Tsang
*Assistant Examiner* — Van D Huynh
(74) *Attorney, Agent, or Firm* — The Law Office of Michael E. Kondoudis

(57) ABSTRACT

An interactive voice advertisement exchange presents an interactive voice advertisement to a user of a voice network who is placed on hold. After the user sends a signal response from a user device to a receiving system and is placed on hold, the hold time and a parameter associated with the signal response are received from the receiving system. Using the hold time and the parameter, an interactive voice advertisement is selected from one or more interactive voice advertisements sent by advertisers. The selected interactive voice advertisement includes a voice message and an application that dictates how the user can interact with the voice message. The voice message and the application of the selected voice interactive voice advertisement are sent to the receiving system. The receiving system sends the voice message to the user device and executes the application during a portion of the hold time.

20 Claims, 5 Drawing Sheets

INTERACTIVE VOICE ADVERTISEMENT EXCHANGE

BACKGROUND

Many businesses use call centers to respond to customer's questions, requests for information, and complaints. Call centers typically employ a queuing mechanism to allow a small number of customer service representatives to respond to requests from a much larger number of callers. When a caller is added to a call center queue, the caller is placed on hold until a customer service representative is available.

In order to make hold times more pleasant, some call centers play music or provide messages regarding the caller's position in the queue during hold times. Other call centers attempt to use hold times more effectively by playing pre-recorded messages. These messages can include common information callers often request. These messages can also include advertisements.

Playing pre-recorded advertisements to callers on hold can be particularly advantageous to businesses using call centers. In addition to improving the hold time experience, advertisements can be used to generate revenue. Call centers are generally expensive to maintain and have to be financed by other profit making parts of the business. By presenting advertisements to callers on hold, call centers can be converted into profit centers.

SUMMARY

An interactive voice advertisement exchange can be used to broker interactive voice advertisements between advertisers and a user who is placed on hold in a voice network. Before the user connects to the voice network, one or more advertisers can send one or more interactive voice advertisements to the interactive voice advertisement exchange. An interactive voice advertisement can include a voice message and an application that dictates how the user can interact with the voice message. Along with each interactive voice advertisement, an advertiser can send a corresponding condition for matching and a corresponding bid. The condition for matching can tell the interactive voice advertisement exchange when the advertiser thinks the interactive voice advertisement should be selected. The bid can tell the interactive voice advertisement exchange how much the advertiser is willing to pay for a presentation of the interactive voice advertisement to the user.

In various embodiments, after the user connects to the voice network and sends a signal response from a user device to a receiving system or device, the receiving system can place the user device on hold. While the user device is on hold, the receiving system can ask the interactive voice advertisement exchange for an interactive voice advertisement by sending a hold time and a parameter associated with the signal response to the interactive voice advertisement exchange. Using the hold time and the parameter, the interactive voice advertisement exchange can select an interactive voice advertisement from one or more interactive voice advertisements sent earlier by the one or more advertisers. An interactive voice advertisement can be selected, for example, in two steps. In the first step, one or more relevant interactive voice advertisements can be found by correlating the hold time and the parameter with the condition for matching of each of the one or more interactive voice advertisements. In the second step, the selected interactive voice advertisement can be found by conducting an auction using the bid of each of the relevant interactive voice advertisements.

Once an interactive voice advertisement is selected by the interactive voice advertisement exchange, the selected interactive voice advertisement can be sent from the interactive voice advertisement exchange to the receiving system. The receiving system can then execute the application of the selected interactive voice advertisement, send the voice message of the selected interactive voice advertisement to the user device, and interact with responses from the user device according to the application during, at least, a portion of the hold time.

Alternatively, once an interactive voice advertisement is selected by the interactive voice advertisement exchange, the interactive voice advertisement exchange can execute the application of the selected interactive voice advertisement. The interactive voice advertisement exchange can then receive a connection to the user device, send the voice message of the selected interactive voice advertisement to the user device, and interact with responses from the user device according to the application during, at least, a portion of the hold time.

In various embodiments, the interactive voice advertisement exchange can include an advertisement storage unit and an advertisement selection unit connected to the advertisement storage unit. The advertisement storage unit can receive and store the one or more interactive voice advertisements from the one or more advertisers. The advertisement selection unit can receive the request for an interactive voice advertisement from the receiving system, select an interactive voice advertisement from the advertisement storage unit, and send the selected interactive voice advertisement to the receiving system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DRAWINGS

The skilled person in the art will understand that the drawings, described below, are for illustration purposes only. The drawings are not intended to limit the scope of the applicant's teachings in any way.

Figure 1:
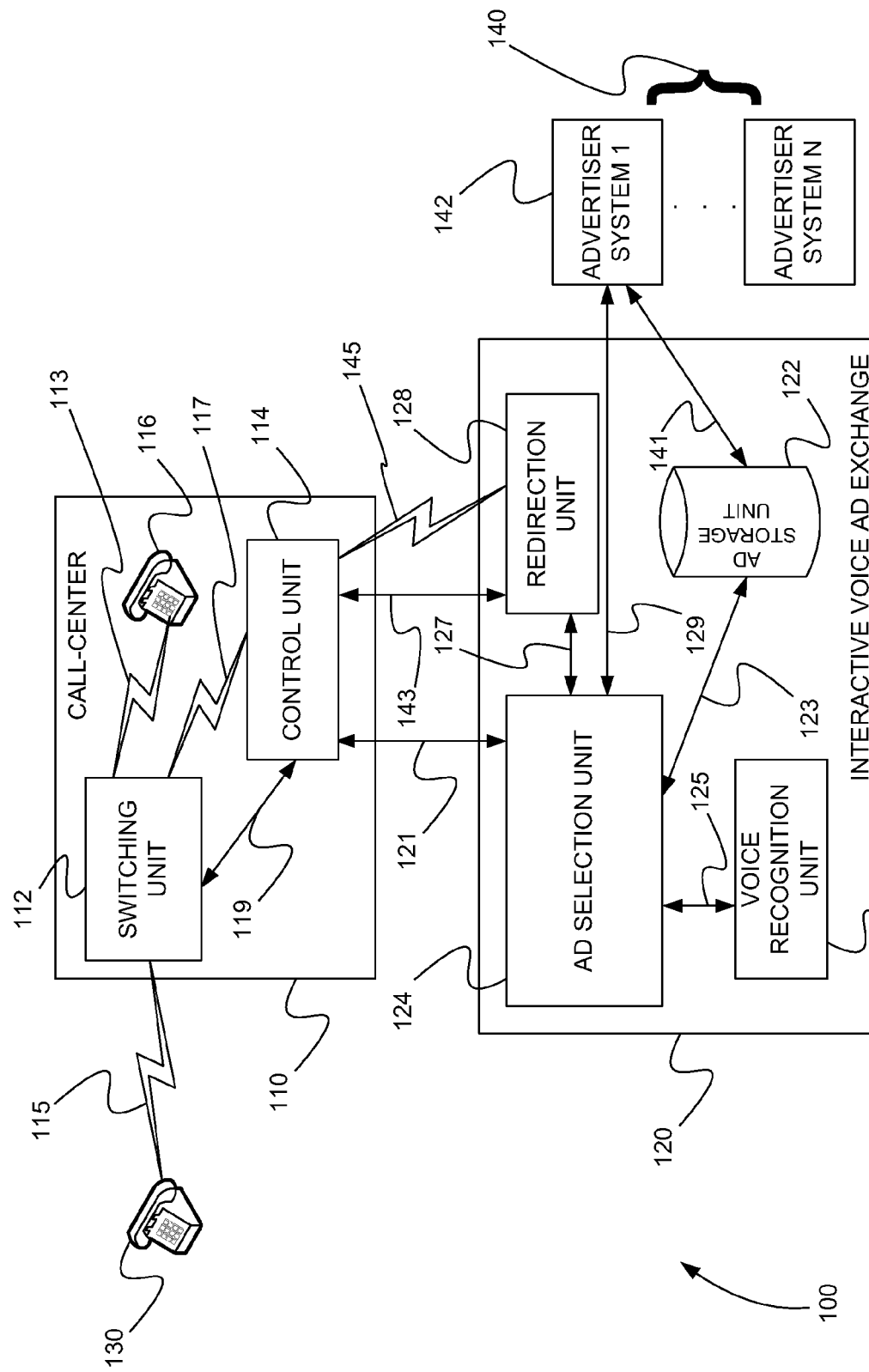
FIG. 1 is a schematic diagram showing one example of a system for presenting an interactive voice advertisement to a user of a voice network through a call center.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION

In various embodiments, an interactive voice advertisement exchange can be used to broker interactive voice advertisements between an advertiser and a user who is placed on hold in a voice network. After a user, using a user device, initiates a call to a receiving system, the receiving system can place the user device on hold for a period of time referred to as a hold time. The user device can include, but is not limited to, a telephone, a mobile device, a computer, or any device capable of sending and receiving voice or telephonic communication. The receiving system can include, but is not limited to, a mobile device, a computer, a call center, or any device capable of sending and receiving voice or telephonic communication and executing instructions on a processor.

During the hold time, the receiving system can communicate with the user device using an interactive voice advertisement. The interactive voice advertisement can include a voice message and an application. The voice message is sent to the user device. A voice message can include a request for an interactive response from the user device. An interactive response can include, but is not limited to, a voice response, a tone response, a text message response, or any telephonic response. The application can be executed by the receiving system. The application can include a set of instructions that dictate how and when the voice message is sent to the user device. These instructions can also dictate how responses from the user device are handled after the voice message has been sent.

The receiving system can obtain the interactive voice advertisement from an advertiser and receive payment for the interactive voice advertisement from the advertiser through an interactive voice advertisement exchange. The interactive voice advertisement exchange can receive and store one or more interactive voice advertisements from one or more advertisers. Along with each interactive voice advertisement, an advertiser can send a corresponding condition for matching and a corresponding bid.

An advertiser can also group one or more interactive voice advertisements into an advertisement campaign and submit one or more advertisement campaigns to the interactive voice advertisement exchange. The one or more interactive voice advertisements in an advertisement campaign can share the same condition for matching and/or bid. An advertisement campaign can, therefore, include at least one condition for matching and at least one bid. An advertisement campaign can also include a limit on the amount of money that can be spent from that campaign.

The advertiser may or may not be the owner of the receiving system. For example, the advertiser could be a car manufacturer and the receiving system could be a call center owned by a mobile phone service provider. In this case, the advertiser is not the owner of the receiving system.

The receiving system can request the interactive voice advertisement from the interactive voice advertisement exchange by sending the interactive voice advertisement exchange a parameter associated with a signal response received from the user device and the hold time. A signal response can include, but is not limited to, a voice message, a tone, or caller identification information.

The interactive voice advertisement exchange can correlate the parameter and the hold time to a condition for matching of the one or more stored interactive voice advertisements and create a list of matching interactive voice advertisements. This list can also be ranked. The interactive voice advertisement exchange can compute or estimate values that measure user engagement levels and other events with respect to each advertiser, interactive voice advertisement, or advertisement campaign and use this information in future rankings of interactive voice advertisements.

The interactive voice advertisement exchange can select the interactive voice advertisement that is sent to the receiving system by conducting an auction. The interactive voice advertisement exchange can use the bids sent with the matching interactive voice advertisements to conduct the auction. Alternatively, the interactive voice advertisement exchange can request and receive bids from the advertisers of the matching advertisement campaigns for interactive voice advertisements from the matching interactive voice advertisements. The interactive voice advertisement associated with the selected bid can be sent to the receiving system.

The interactive voice advertisement exchange can obtain payment for the interactive voice advertisement that is sent to the receiving system. When the interactive voice advertisement is sent to the receiving system and is communicated to the user device, the interactive voice advertisement exchange can request and receive payment from the advertiser who sent the selected bid. The interactive voice advertisement exchange can share the payment with the owner of the receiving system.

The interactive voice advertisement exchange can be a sequence of instructions that are executed by any combination of hardware and software. For example, the interactive voice advertisement exchange can be a separate computer server connected to the receiving system. Or, the interactive voice advertisement exchange can be a separate software program executed by the receiving system.

An interactive voice advertisement exchange can be used by a wide variety of businesses to improve the hold time experience of callers and to generate additional revenue or subsidize services. Voice network owners, for example, can use an interactive voice advertisement exchange to provide subsidized or free voice plans if a user is willing to listen to a fixed number of interactive voice advertisements. In various embodiments, voice over internet protocol (VoIP) or mobile phone businesses can also use an interactive voice advertisement exchange to generate revenue or subsidize services. In various embodiments, call centers can use an interactive voice advertisement exchange to generate revenue.

FIG. 1 is a schematic diagram showing one example of a system 100 for presenting an interactive voice advertisement to a user of a voice network through a call center 110. System 100 includes user device 130, call center 110, interactive voice advertisement exchange 120, and one or more advertiser systems 140.

The user can place a call from user device 130 to call center 110 using voice network 115. User device 130 can include, but is not limited to, a telephone, a mobile device, a computer, or any device capable of sending and receiving voice or telephonic communication. Voice network 115 can include, but is not limited to, a public switched telephone network (PSTN), a VoIP network, or a mobile telephone network.

Call center 110 can include switching unit 112, control unit 114, and customer service device 116. Switching unit 112 can be used to route voice connections within call center 110. Switching unit 112 can be, for example, a private branch exchange (PBX), a router for an Internet protocol (IP) network, or any unit capable of routing telephonic communication. Control unit 114 can be used to manage the queue of call center 110. Managing the queue can include placing users on hold and connecting them to customer service representatives. Control unit 114 can be, for example, an automatic call distributor (ACD). Customer service device 116 is used by a customer service representative to communicate with a user. Customer service device 116 can be, for example, a telephone.

When the user places a call from user device 130 to call center 110 using voice network 115, switching unit 112 can route the call to control unit 114 over voice connection 117. After the call has been routed, the user can send a signal response from user device 130 to control unit 114 requesting a customer service representative, for example, at customer service device 116. In various embodiments, the user's telephone number, caller identification information, IP address, or any information identifying the user's call can be the signal response sent from user device 130 to control unit 114. After receiving the signal response and if, for example, customer service device 116 is busy, control unit 114 can place user device 130 on hold for a period of time referred to as the hold time.

During the hold time, control unit 114 can present an interactive voice advertisement to user device 130. Control unit 114 can obtain the interactive voice advertisement from interactive voice advertisement exchange 120. In order to obtain an appropriate and relevant interactive voice advertisement for user device 130, control unit 114 can send the hold time and a parameter determined from the signal response to interactive voice advertisement exchange 120 using data connection 121. The hold time can be used by interactive voice advertisement exchange 120 to select an interactive voice advertisement of the appropriate length. The parameter can be used by the interactive voice advertisement exchange 120 to select a relevant interactive voice advertisement.

The parameter that can be sent to interactive voice advertisement exchange 120 can include, but is not limited to, a keyword, the signal response itself, an identifier of a service provided by call center 110, or a demographic attribute of the user. Control unit 114 can obtain a keyword, for example, by converting the signal response to text using a speech recognition system. Control unit 114 can send the signal response itself and allow interactive voice advertisement exchange 120 to select a parameter for comparison. Control unit 114 can send an identifier of a service provided by call center 110. For example, if call center 110 provides technical support for wireless routers, control unit 114 can send "wireless routers" as the parameter.

Control unit 114 can obtain a demographic attribute of the user directly by reading a stored user profile that is accessed, for example, by correlating the user's phone number or voice with the stored user profile. Control unit 114 can also obtain a demographic attribute by inferring the attribute from an item in the user's profile or the signal response. For example, if the user's profile specifies that the user called at a certain time of day, and it has previously been determined that at that time of day mostly older men call, control unit 114 could infer that the caller was an older male. Control unit 114 can obtain a demographic attribute by inferring the attribute from the signal response without converting the signal response to text. For example, the gender of a speaker can be inferred from a signal response using characteristics of the speech pattern rather than the words spoken. Control unit may or may not include a voice analysis or recognition engine that can be used to infer the attribute from the signal response.

After control unit 114 sends the hold time and the parameter determined from the signal response to interactive voice advertisement exchange 120, control unit 114 can receive from interactive voice advertisement exchange 120 an interactive voice advertisement using data connection 121. The interactive voice advertisement can include a voice message and an application that dictates how the user can interact with the voice message. The voice message can include a request for a voice response, telephonic response, or text message from user device 130. Control unit 114 can send the voice message to user device 130 and execute the application during a portion of the hold time.

The application can include a set of instructions that dictate how and when the voice message is sent to user device 130. These instructions can also dictate how responses from user device 130 are handled by control unit 114 after the voice message has been sent. The application can include, but is not limited to, a voice extensible markup language (VXML) file, a speech application language tags (SALT) file, or any language that an interactive voice response (IVR) system can understand. Alternatively, control unit 114 can receive the application in one format and convert it to another format currently used by call center 110.

After the hold time, control unit 114 can instruct switch 112, using data connection 119, to connect user device 130 to customer service device 116 using voice connection 113. In various embodiments, control unit 114 can connect user device 130 to customer service device 116 using a direct voice connection (not shown) between control unit 114 and customer service device 116.

Before an interactive voice advertisement is requested by control unit 114, interactive voice advertisement exchange 120 receives one or more interactive voice advertisements from one or more advertiser systems 140. An advertiser system can be, for example, a computer system that can communicate with data and voice networks. When control unit 114 requests an interactive voice advertisement, interactive voice advertisement exchange 120 can compare the parameter and the hold time received from control unit 114 to the one or more stored interactive voice advertisements and create a list of matching interactive voice advertisements.

Interactive voice advertisement exchange 120 can select the interactive voice advertisement that is sent to control unit 114 by conducting an auction with the matching interactive voice advertisements. Interactive voice advertisement exchange 120 can conduct the auction using the bids sent with the matching interactive voice advertisements before user device 130 is placed on hold. Alternatively, interactive voice advertisement exchange 120 can request and receive bids from the advertisers of the matching interactive voice advertisements after user device 130 is placed on hold. The interactive voice advertisement associated with the selected bid can be sent to control unit 114.

Figure 2:
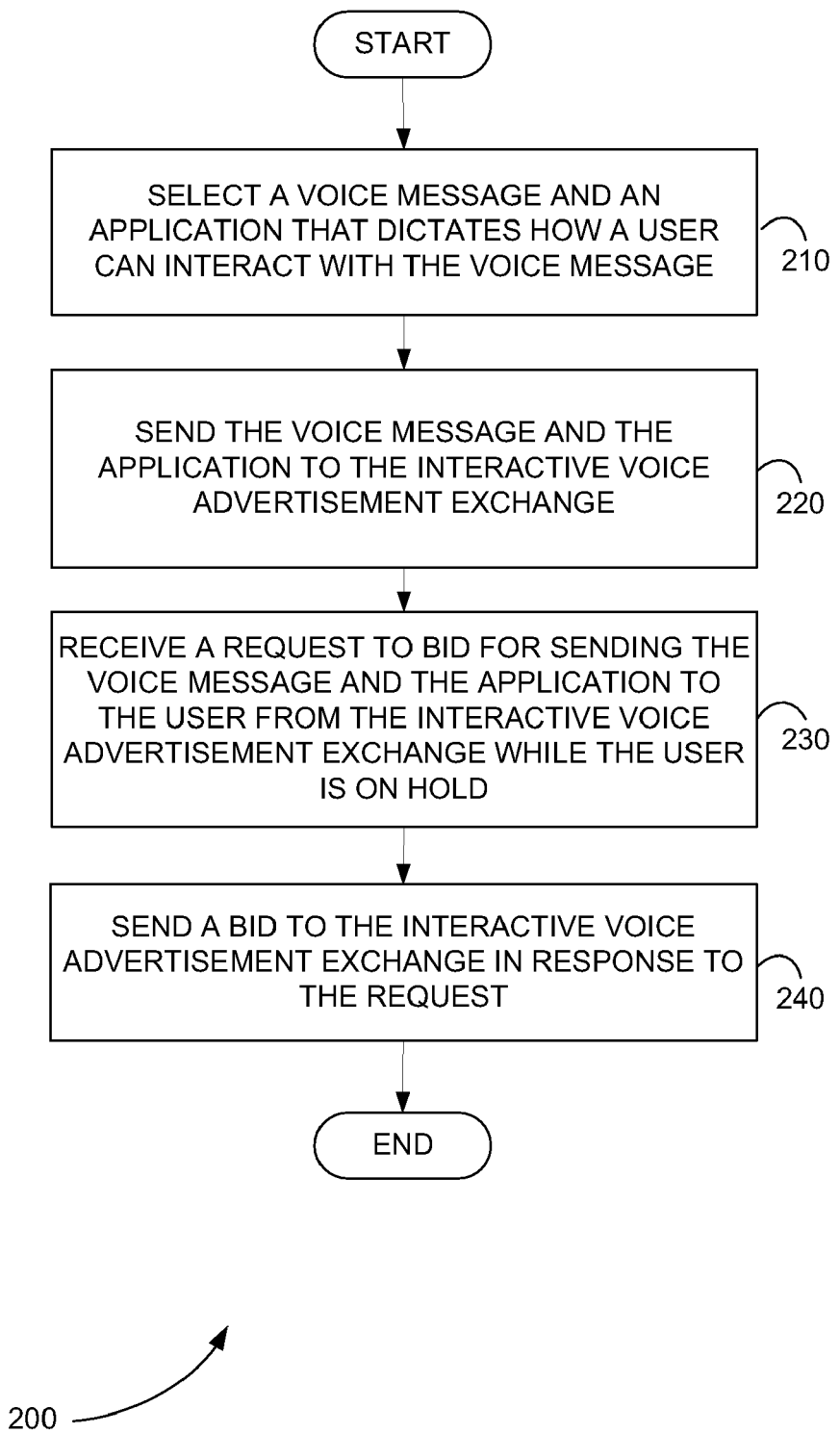
FIG. 2 is a flowchart showing one example of a method for sending an interactive voice advertisement to an interactive voice advertisement exchange.

Digressing briefly from FIG. 1, FIG. 2 shows a method from the perspective of an advertiser system. FIG. 2 is a flowchart showing one example of a method 200 for sending an interactive voice advertisement to an interactive voice advertisement exchange.

In step 210 of method 200, a voice message and an application that dictates how a user can interact with the voice message are selected. The voice message and the application are components of the interactive voice advertisement. The application can include, but is not limited to, a VXML file or a SALT file.

In step 220, the voice message and the application are sent to the interactive voice advertisement exchange.

In step 230, a request to bid for sending the voice message and the application to the user is received from the interactive voice advertisement exchange while the user is on hold.

In step 240, a bid is sent to the interactive voice advertisement exchange in response to the request. The bid can be based on a monetization model used by the interactive voice advertisement exchange. Monetization of the interactive voice advertisement can be impression based, interaction based, or acquisition based. The monetization is impression based if the advertiser is willing pay when the interactive voice advertisement is sent to the user. The monetization is interaction based if the advertiser is willing pay when the user responds in any way to the interactive voice advertisement. The monetization is acquisition based if the advertiser is willing pay when the user pays for something in response to the interactive voice advertisement.

A single bid can include amounts from two or more monetization models. For example, a bid can include an amount of money to be paid if the user is sent the voice message, an amount of money to be paid if the user responds to the voice message, and an amount of money to be paid if the user pays for something in response to the voice message.

In various embodiments, method 200 can include receiving a notification from the interactive voice advertisement exchange that the bid is accepted.

In various embodiments, method 200 can include selecting a condition for matching. The condition for matching can include a keyword.

In various embodiments, method 200 can include receiving a bill from the interactive voice advertisement exchange that includes amounts from two monetization models. For example, a bill can include an amount when the voice message is sent to the user and an amount when the user responds to the voice message.

Returning to FIG. 1, interactive voice advertisement exchange 120 can include advertisement storage unit 122, advertisement selection unit 124, voice analysis and recognition unit 126, and redirection unit 128. Advertisement storage unit 122, advertisement selection unit 124, voice analysis and recognition unit 126, and redirection unit 128 can each be a sequence of instructions that are executed by any combination of hardware and software. For example, each of advertisement storage unit 122, advertisement selection unit 124, voice analysis and recognition unit 126, and redirection unit 128 can be a separate computer server. Each of advertisement storage unit 122, advertisement selection unit 124, voice analysis and recognition unit 126, and redirection unit 128 can be a separate software program executed by one computer system. Or, each of advertisement storage unit 122, advertisement selection unit 124, voice analysis and recognition unit 126, and redirection unit 128 can be a component of one software program.

Advertisement storage unit 122 can receive one or more interactive voice advertisements from one or more advertiser systems 140. An advertiser can use one or more advertiser systems to send the one or more interactive voice advertisements, for example. An advertiser system can be, for example, a computer system that can communicate with data and voice networks.

Along with each interactive voice advertisement, an advertiser can send a corresponding condition for matching and a corresponding bid. The condition for matching can be, for example, a keyword. If the keyword matches the parameter sent by control unit 114, for example, the interactive voice advertisement corresponding to the keyword can be selected. The condition for matching can also be the voice message of the interactive voice advertisement itself. If the condition for matching is the voice message itself, advertisement selection unit 124 can use voice analysis and recognition unit 126, for example, to convert the speech of the voice message to text and select one or more keywords from the text for matching.

For example, advertiser system 142 can send an interactive voice advertisement to advertisement storage unit 122 using data connection 141. If a condition for matching an interactive voice advertisement sent by advertiser system 142 is the voice message itself, advertisement storage unit 122 can send the voice message to advertisement selection unit 124 using data connection 123. Advertisement selection unit 124 can send the voice message to voice analysis and recognition unit 126 using data connection 125, for example. Voice analysis and recognition unit 126 can convert the speech of the voice message to text and select one or more keywords from the text for matching. The one of more keywords can be returned to advertisement storage unit 122 using the same path and stored with the corresponding interactive voice advertisement.

Control unit 114 can request an interactive voice advertisement by sending a hold time and a parameter to advertisement selection unit 124 using data connection 121. Advertisement selection unit 124 receives the hold time and the parameter. The parameter can include the signal response sent from user device 130 to control unit 114.

If the parameter includes the signal response, advertisement selection unit 124 can send the signal response to voice analysis and recognition unit 126 using data connection 125. Voice analysis and recognition unit 126 can be, for example, Microsoft speech server (MSS) or Nuance Recognizer. Voice analysis and recognition unit 126 can convert the signal response to text and use one or more words from the text as the parameter. In various embodiments, voice analysis and recognition unit 126 can replace the signal response with a demographic parameter that is determined from the signal response without converting the signal response to text. Voice analysis and recognition unit 126 can, for example, infer a demographic parameter from the signal response using characteristics of the speech pattern rather than the words spoken.

After receiving or processing the parameter, advertisement selection unit 124 uses the parameter and the hold time to select one or more interactive voice advertisements from advertisement storage unit 122. The hold time can be used by advertisement selection unit 124 to select an interactive voice advertisement of an appropriate length. The parameter can be used by advertisement selection unit 124 to compare to a condition for matching of an interactive voice advertisement. The condition for matching can be a keyword sent by the advertiser or a keyword found by processing the voice message of the interactive voice advertisement.

After selecting one or more matching interactive voice advertisements from advertisement storage unit 122, advertisement selection unit 124 can conduct an auction. Advertisement selection unit 124 can conduct an auction using bids received from advertiser systems 140 before user device 130 is placed on hold. Alternatively, advertisement selection unit 124 can conduct an auction with one or more advertiser systems that sent the matching interactive voice advertisements while user device 130 is placed on hold. If, for example, advertiser system 142 sends a matching interactive voice advertisement, advertiser system 142 can participate in the auction conducted by advertisement selection unit 124 using data connection 129.

Advertisement selection unit 124 can select an interactive voice advertisement from the auction. The selected interactive voice advertisement can include the interactive voice advertisement with highest monetary bid. In various embodiments, the selected interactive voice advertisement can include the interactive voice advertisement with the highest combined monetary bid and relevance measure. One auction that bases its selection on the highest combined monetary bid and relevance measure is a generalized second price (GSP) auction. A relevance measure can include the rate at which users have interacted with the interactive voice advertisement in the past. A relevance measure can also include the degree to which the parameter received from control unit 114 and the condition for matching of the interactive voice advertisement match.

The selected interactive voice advertisement can be composed of a voice message and an application that dictates how user device 130 can interact with the voice message. The voice message and the application can be sent from advertisement selection unit 124 to control unit 114 using data connection 121.

Control unit 114 can send the voice message of the selected interactive voice advertisement to user device 130. Control unit 114 can execute the application of the selected interactive voice advertisement. The application can include accesses back to the advertiser who sent the selected interactive voice advertisement.

For example, the voice message sent to user device 130 can say, "press or say one to speak to a salesperson." The application executed by control unit 114 can then access a call center (not shown) of the advertiser who sent the selected interactive voice advertisement. Or, for example, the voice message sent to user device 130 can say, "press or say one to hear more information about the product." The application executed by control unit 114 can then access a link on a Web server (not shown) of the advertiser who sent the selected interactive voice advertisement. The link can then stream a signal response about the product back to control unit 114 and on to user device 130.

Interactive voice advertisement exchange 120 can be used to prevent advertiser fraud. Advertiser fraud occurs when an advertiser uses an advertisement for a purpose other than the one for which the advertisement was originally intended. For example, an advertiser could use an interactive voice advertisement to connect directly with user device 130 without informing call center 110 or interactive voice advertisement exchange 120, effectively hijacking the communication channel with user device 130. Therefore, any accesses back to the advertiser in an application executed by control unit 114 can lead to advertiser fraud. Also, one of the goals of advertiser fraud prevention is to make sure that control is returned back to control unit 114 one or before a specified time so that the user experience is not hijacked away from call center 110.

In order to prevent advertiser fraud, advertisement selection unit 124 can preprocess the application before it is executed by control unit 114. The application can include, but is not limited to, a VXML file or a SALT file. The preprocessing performed by advertisement selection unit 124 can remove or limit accesses back to the advertiser. In various embodiments, advertisement storage unit 122 can be used to preprocess the application after it is sent by an advertiser using one of advertisement systems 140.

In various embodiments, advertisement selection unit 124 or advertisement storage unit can replace accesses made directly back to the advertiser with proxy accesses made through redirection unit 128. The proxy accesses can be trusted communication links that redirection unit 128 has established with the advertiser. Advertisement selection unit 124 can obtain the proxy accesses from redirection unit 128 using data connection 127. In various embodiments redirection unit 128 is part of call center 110 or independent of both call center 110 and interactive voice advertisement exchange 120.

Once advertisement selection unit 124 has replaced accesses in an application made directly back to the advertiser with proxy accesses made through redirection unit 128, the application can be sent to control unit 114. Control unit 114 can execute the application. When the application requests information from the advertiser, control unit 114 can be directed to redirection unit 128 by a proxy access. Control unit 114 can exchange data with redirection unit 128 using data connection 143, for example. Control unit 114 can exchange signal responses with redirection unit 128 using voice connection 145, for example. Using data connection 143 or voice connection 145, redirection unit 128 can accept an access or communication in the application from control unit 114 that was originally meant for the advertiser. Redirection unit 128, in turn, can use a trusted data connection (not shown) or voice connection (not shown) to a system of the advertiser to gather information requested by the access.

Figure 3:
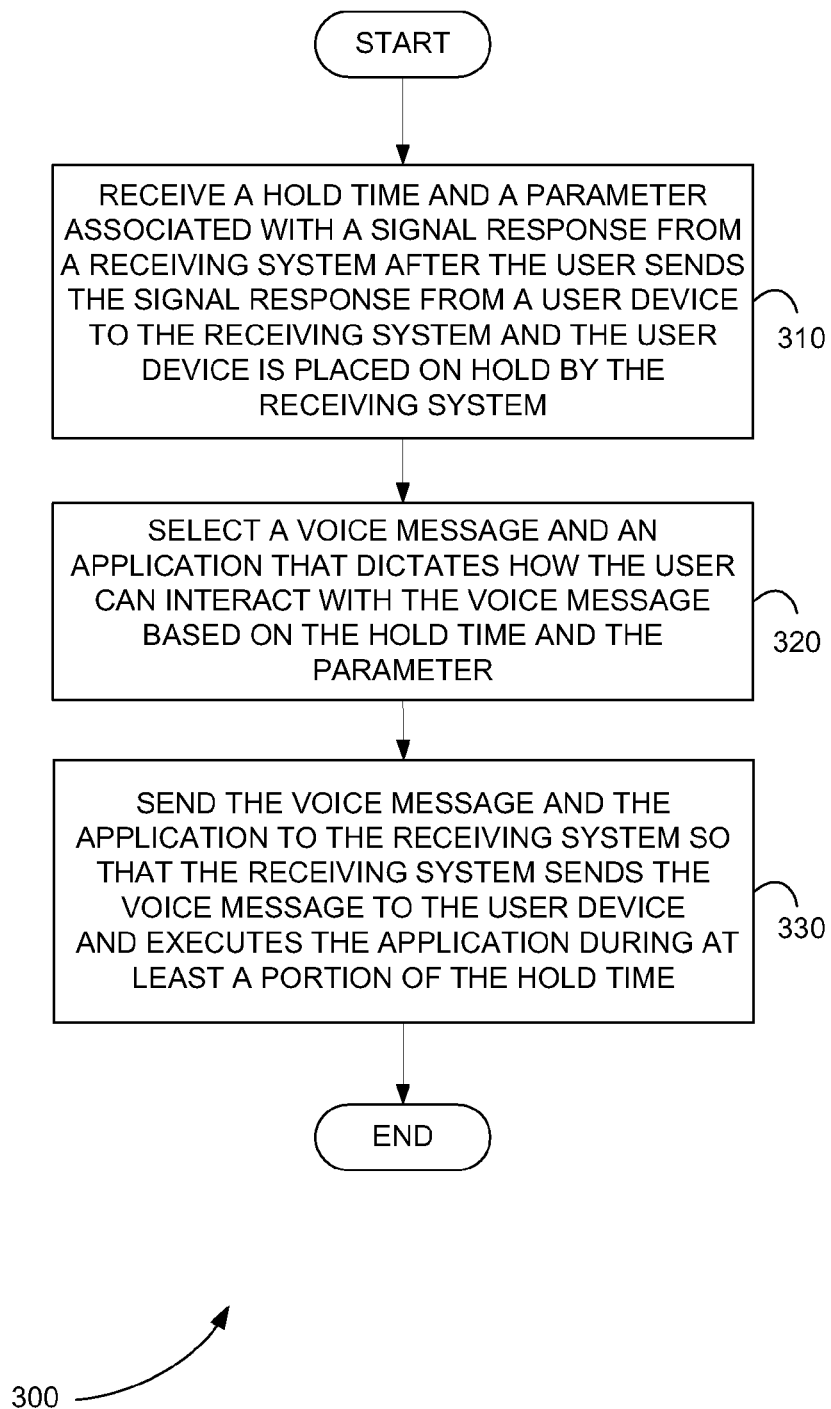
FIG. 3 is a flowchart showing one example of a method for presenting an interactive voice advertisement to a user of a voice network through a receiving system.

FIG. 3 is a flowchart showing one example of a method 300 for presenting an interactive voice advertisement to a user of a voice network through a receiving system.

In step 310 of method 300, a hold time and a parameter associated with a signal response are received from a receiving system after the user sends the signal response from a user device to the receiving system and the user device is placed on hold by the receiving system. The parameter can include, but is not limited to, a keyword, the signal response itself, an identifier of a service provided by a call center, or a demographic attribute of the user.

The receiving system can include, for example, a network exchange for a voice network or a VoIP network that is used to provide subsidized or free voice plans if the user is willing to listen to a fixed number of interactive voice advertisements. In various embodiments, the receiving system can include a call center that uses interactive voice advertisements to generate revenue. The receiving system can be a control unit of the call center.

In step 320, a voice message and an application that dictates how the user can interact with the voice message are selected based on the hold time and the parameter. The application can include, but is not limited to, a VXML file or a SALT file.

The voice message and the application can be selected after advertisers send advertisement campaigns, advertisement campaigns that are relevant are selected, and an auction is conducted. For example, before the user device is placed on hold, one or more advertisement campaigns can be received from one or more advertisers. These one or more advertisement campaigns can be stored. Each of the stored one or more advertisement campaigns can include a stored voice message, a stored application, a stored matching condition, and a stored bid. After the user device is placed on hold, one or more relevant advertisement campaigns can be selected from the stored one or more advertisement campaigns by correlating the hold time and the parameter with each stored condition for matching of each of the stored one or more advertisement campaigns. An auction can then be conducted using each stored bid of each of the selected one or more relevant advertisement campaigns. A stored voice message corresponding to a selected bid from the auction can be selected as the voice message. A stored application corresponding to the selected bid can be selected as the application.

The selected bid can include, but is not limited to, an amount of money to be paid by an advertiser of the selected bid if the user device is sent the voice message, an amount of money to be paid by the advertiser of the selected bid if the user device responds to the voice message, or an amount of money to be paid by the advertiser of the selected bid if the user of the user device pays for a product or service in response to the voice message. In various embodiments, the selected bid can include any combination of these three amounts.

In step 330, the voice message and the application are sent to the receiving system so that the receiving system sends the voice message to the user device and executes the application during at least a portion of the hold time. The interactive voice advertisement includes the voice message and the application.

In various embodiments, method 300 can include sending bills to the advertiser of the selected bid that mirror the selected bid. For example, the advertiser can be sent a first bill for an amount of money to be paid if the user device is sent the voice message, when the voice message is sent to the user device. The advertiser can be sent a second bill for an amount of money to be paid if the user device responds to the voice message, when the when the user device responds to the voice message. Finally, the advertiser can be sent a third bill for an amount of money to be paid if the user of the user device pays for a product or service in response to the voice message, when the user pays for a product or service in response to the voice message.

In various embodiments of method 300, the parameter and the hold time can be compared with previous parameters and hold times received from the receiving system in order to determine if publisher fraud is occurring. Publisher fraud can occur when a receiving system (i.e., a publisher) fraudulently increases hold times or requests interactive voice advertisements with high costs for advertisers. The cost of an interactive voice advertisement can be quantified using measures such as the effective cost per thousand impressions (eCPM). A publisher who is committing publisher fraud can, for example, frequently request interactive voice advertisements with a high eCPM.

In various embodiments of method 300, the application can be preprocessed by replacing an access made directly back to an advertiser in the application with a proxy access. Advertiser fraud can occur when an advertiser hijacks the communication channel between the user device and the receiving system. In order to reduce or prevent advertiser fraud, accesses back to the advertiser can be removed or replaced in the application. Accesses back to the advertiser can be replaced, for example, with proxy accesses that direct the user through a trusted proxy system back to the advertiser.

Figure 4:
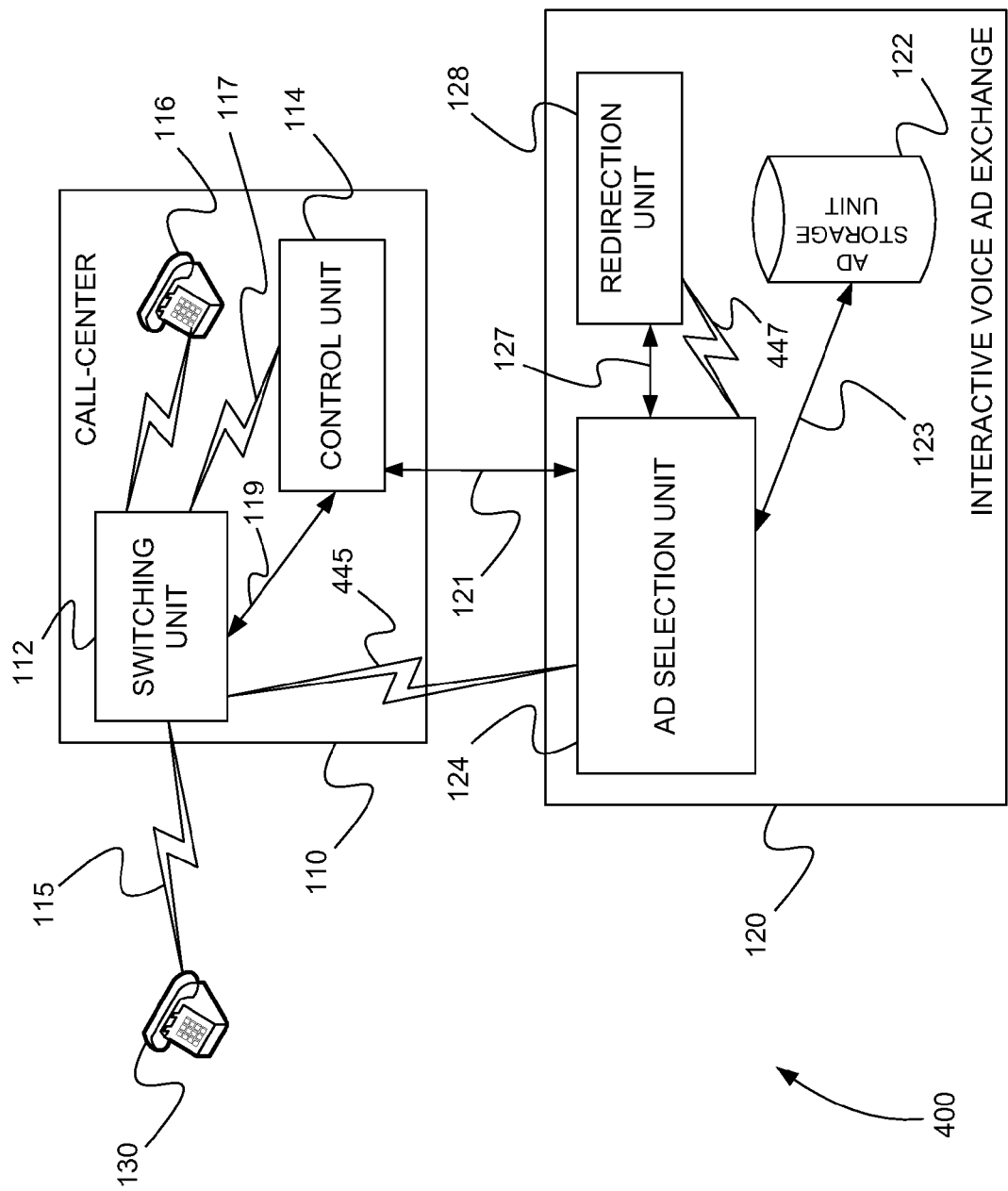
FIG. 4 is a schematic diagram of one example of a system for presenting an interactive voice advertisement to a user of a voice network from an interactive voice advertisement exchange.

FIG. 4 is a schematic diagram of one example of a system 400 for presenting an interactive voice advertisement to a user of a voice network 115 from an interactive voice advertisement exchange 120. System 400 includes user device 130, call center 110, and interactive voice advertisement exchange 120.

The user can place a call from user device 130 to call center 110 using voice network 115. Call center 110 can include switching unit 112, control unit 114, and customer service device 116. Switching unit 112 can be used to route voice connections within call center 110. Switching unit 112 can be, for example, a private branch exchange (PBX). Control unit 114 can be used to manage the queue of call center 110.

When the user places a call from user device 130 to call center 110 using voice network 115, switching unit 112 can route the call to control unit 114 over voice connection 117. After the call has been routed, the user can send a voice or signal response from user device 130 to control unit 114 requesting a customer service representative, for example, at customer service device 116. After receiving the signal response and if, for example, customer service device 116 is busy, control unit 114 can place user device 130 on hold for a period of time referred to as the hold time.

Interactive voice advertisement exchange 120 can include advertisement storage unit 122, advertisement selection unit 124, and redirection unit 128. Control unit 114 can request that an interactive voice advertisement be sent to user device 130 by sending a hold time and a parameter to advertisement selection unit 124 using data connection 121. Advertisement selection unit 124 receives the hold time and the parameter. The parameter can include the signal response sent from user device 130 to control unit 114.

After receiving or processing the parameter, advertisement selection unit 124 uses the parameter and the hold time to select one or more interactive voice advertisements from advertisement storage unit 122 using data connection 123. The interactive voice advertisements stored by advertisement storage unit 122 are, for example, received from one or more advertisers. The hold time can be used by advertisement selection unit 124 to select an interactive voice advertisement of an appropriate length. The parameter can be used by advertisement selection unit 124 to compare to a condition for matching of an interactive voice advertisement.

Advertisement selection unit 124 can create a list of one or more interactive voice advertisements that match the hold time and the parameter. Advertisement selection unit 124 can rank the list based on the relevance of each interactive voice advertisement to the parameter, or on the prior history success rate of each interactive voice advertisement in receiving a response from a user. In various embodiments, advertisement selection unit 124 can conduct an auction with advertisers for some portion of the ranked interactive voice advertisements and rearrange the rankings based on the bids received from the advertisers. Advertisement selection unit 124 can select the highest ranked interactive voice advertisement for presentation to the user. The selected interactive voice advertisement can include a voice message and an application that dictates how user device 130 can interact with the voice message.

After control unit 114 requests that an interactive voice advertisement be sent to user device 130, control unit 114 can connect user device 130 to advertisement selection unit 124 through switching unit 112 using data connection 119. User device 130 and advertisement selection unit 124 can then communicate using voice connection 445, for example. Advertisement selection unit 124 can send the voice message to user device 130 using voice connection 445 and execute the application during at least a portion of the hold time.

Voice connection 445 can also allow advertisement selection unit 124 to receive a response from user device 130. The response can be, but is not limited to, a voice response or tone response. User device 130 can also respond to advertisement selection unit 124 with a text message along a data connection (not shown).

Accesses back to the advertiser in an application executed by advertisement selection unit 124 can lead to advertiser fraud. In order to prevent advertiser fraud, advertisement selection unit 124 can preprocess the application before it executes the application. The preprocessing performed by advertisement selection unit 124 can remove or limit accesses back to the advertiser. In various embodiments, advertisement selection unit 124 can replace accesses made directly back to the advertiser with proxy accesses made through redirection unit 128. The proxy accesses can be trusted communication links the redirection unit 128 has established with the advertiser. Advertisement selection unit 124 can obtain the proxy accesses from redirection unit 128 using data connection 127.

When the application requests information from the advertiser, advertisement selection unit 124 can be directed to redirection unit 128 by a proxy access. Advertisement selection unit 124 can exchange data with redirection unit 128 using data connection 127, for example. Advertisement selection unit 124 can exchange signal responses with redirection unit 128 using voice connection 447, for example. Using data connection 127 or voice connection 447, redirection unit 128 can accept an access in the application from advertisement selection unit 124 that was originally meant for the advertiser.

Figure 5:
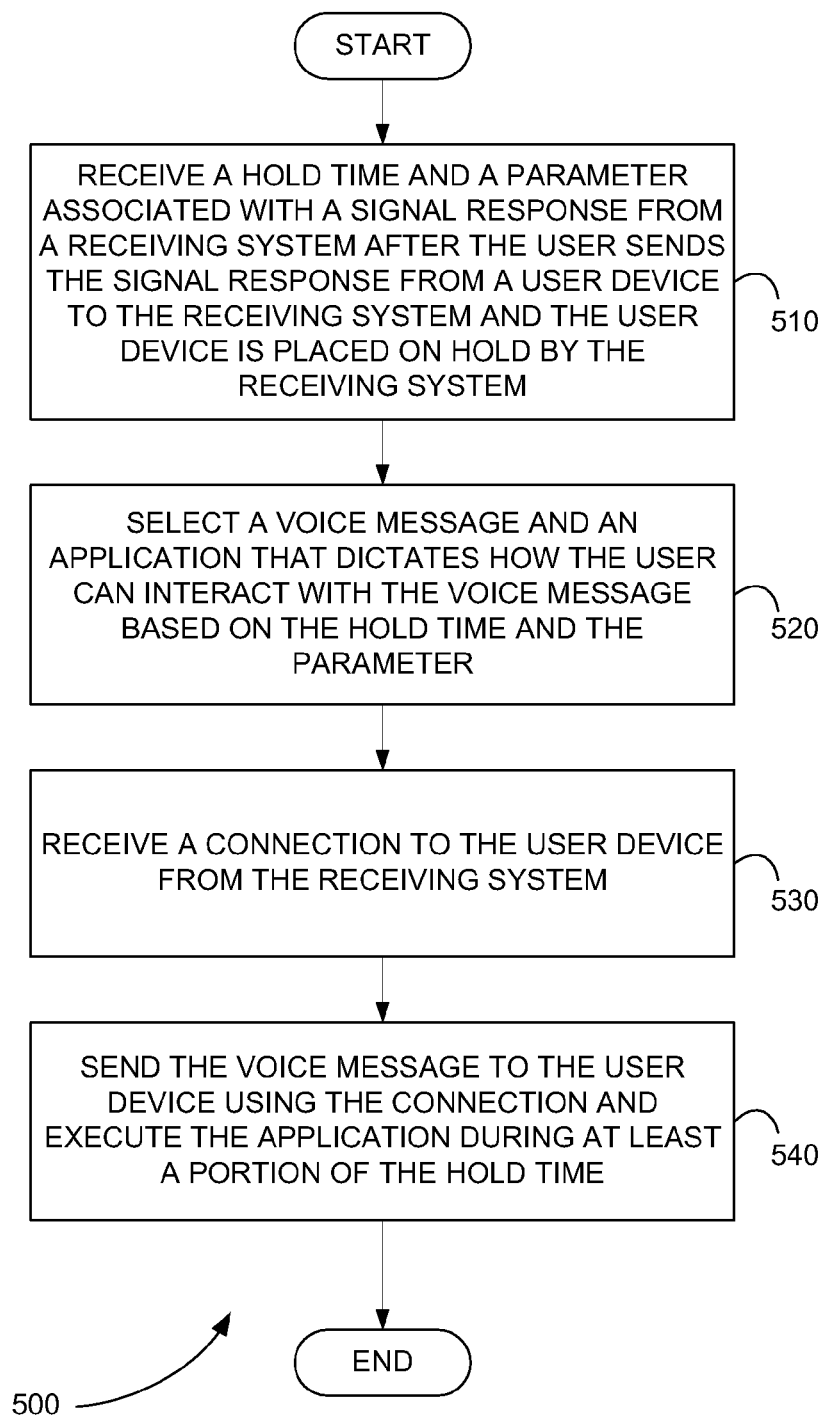
FIG. 5 is a flowchart showing one example of a method for presenting an interactive voice advertisement to a user of a voice network directly from an interactive voice advertisement exchange.

FIG. 5 is a flowchart showing one example of a method 500 for presenting an interactive voice advertisement to a user of a voice network directly from an interactive voice advertisement exchange.

In step 510 of method 500, a hold time and a parameter associated with a signal response are received from a receiving system after the user sends the signal response from a user device to the receiving system and the user device is placed on hold by the receiving system. The parameter can include, but is not limited to, a keyword, the signal response itself, an identifier of a service provided by a call center, or a demographic attribute of the user.

The receiving system can include, for example, a network exchange for a voice network or a VoIP network that is used to provide subsidized or free voice plans if the user is willing to listen to a fixed number of interactive voice advertisements. In various embodiments, the receiving system can include a call center that uses interactive voice advertisements to generate revenue. The receiving system can be a control unit of the call center (e.g., control unit 114 of FIG. 1).

In step 520, a voice message and an application that dictates how the user can interact with the voice message are selected based on the hold time and the parameter. The application can include, but is not limited to, a VXML file or a SALT file.

In step 530, a connection to the user device is received from the receiving system.

In step 540, the voice message is sent to the user device using the connection and the application is executed during at least a portion of the hold time. The interactive voice advertisement includes the voice message and the application.

In various embodiments of method 500, a response is received from the user device and the response is processed according to the application. The response can be, but is not limited to, a voice response or a tone response. The user device can also respond with a text message.

In various embodiments of method 500, the application can be preprocessed by replacing an access made directly back to an advertiser in the application with a proxy access.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A method for presenting an interactive voice advertisement to a user of a voice network, comprising:
    after the user sends a signal response from a user device to a receiving system and the user device is placed on hold by the receiving system, receiving a hold time and a parameter associated with the signal response from the receiving system;
    selecting a voice message and an application that dictates how the user can interact with the voice message based on the hold time and the parameter; and
    sending the voice message and the application to the receiving system so that the receiving system sends the voice message to the user device and executes the application during at least a portion of the hold time, the interactive voice advertisement comprising the voice message and the application.

2. The method of claim 1, wherein the receiving system comprises a control unit of a call center.

3. The method of claim 2, wherein the parameter comprises an identifier of a service provided by the call center.

4. The method of claim 1, wherein the parameter comprises the signal response.

5. The method of claim 1, wherein the application comprises a voice extensible markup language file.

6. The method of claim 1, wherein the application comprises a speech application language tags file.

7. The method of claim 1, wherein selecting the voice message and the application comprises:
    before the user device is placed on hold, receiving one or more advertisement campaigns from one or more advertisers and storing the one or more advertisement campaigns; wherein each of the stored one or more advertisement campaigns includes a stored voice message, a stored application, a stored matching condition, and a stored bid;
    after the user device is placed on hold, selecting one or more relevant advertisement campaigns from the stored one or more advertisement campaigns by correlating the hold time and the parameter with each stored condition for matching of each of the stored one or more advertisement campaigns and conducting an auction using each stored bid of each of the selected one or more relevant advertisement campaigns; and
    selecting a stored voice message corresponding to a selected bid from the auction as the voice message and selecting a stored application corresponding to the selected bid as the application.

8. The method of claim 7, wherein the selected bid comprises a first amount of money to be paid by an advertiser who sent the selected bid if the user device is sent the voice message and a second amount of money to be paid by the advertiser if the user device responds to the voice message.

9. The method of claim 8, further comprising sending a first bill in the first amount to the advertiser when the voice message is sent to the user device and sending a second bill in the second amount to the advertiser when the user device responds to the voice message.

10. The method of claim 1, further comprising comparing the parameter and the hold time with previous parameters and hold times received from the receiving system in order to determine if publisher fraud is occurring.

11. The method of claim 1, further comprising preprocessing the application by replacing an access made directly back to an advertiser in the application with a proxy access.

12. A method for presenting an interactive voice advertisement to a user of a voice network, comprising:
after the user sends a signal response from a user device to a receiving system and the user device is placed on hold by the receiving system, receiving a hold time and a parameter associated with the signal response from the receiving system;
selecting a voice message and an application that dictates how the user can interact with the voice message based on the hold time and the parameter;
receiving a connection to the user device from the receiving system; and
sending the voice message to the user device using the connection and executing the application during at least a portion of the hold time, the interactive voice advertisement comprising the voice message and the application.

13. The method of claim 12, further comprising receiving a response from the user device and processing the response according to the application.

14. The method of claim 13, wherein the response comprises a voice response.

15. The method of claim 12, further comprising preprocessing the application by replacing an access made directly back to an advertiser in the application with a proxy access.

16. An interactive voice advertisement exchange, comprising:
an advertisement storage unit that receives one or more interactive voice advertisements from one or more advertiser systems; and
an advertisement selection unit connected to the advertisement storage unit that
receives a hold time and a parameter associated with a signal response from a receiving system after a user sends the signal response from a user device to the receiving system and the user device is placed on hold by the receiving system,
selects one or more interactive voice advertisements from the advertisement storage unit that correlate with the hold time and the parameter,
conducts an auction using the selected one or more interactive voice advertisements,
selects an interactive voice advertisement from the auction, and
sends a voice message and an application that dictates how the user device can interact with the voice message from the selected interactive voice advertisement to the receiving system.

17. The interactive voice advertisement exchange of claim 16, further comprising a voice analysis and recognition unit connected to the advertisement selection unit.

18. The interactive voice advertisement exchange of claim 17, wherein the parameter comprises the signal response and wherein the voice analysis and recognition unit converts the signal response to text.

19. The interactive voice advertisement exchange of claim 17, wherein the parameter comprises the signal response and wherein the voice analysis and recognition unit determines a demographic parameter from the signal response without converting the signal response to text.

20. The interactive voice advertisement exchange of claim 16, further comprising a redirection unit connected to the advertisement selection unit and an advertiser that accepts an access in the application from the receiving system originally meant for the advertiser but replaced by the advertisement selection unit during preprocessing of the application.

* * * * *